US009239575B2

(12) United States Patent
Weddle et al.

(10) Patent No.: US 9,239,575 B2

(45) Date of Patent: Jan. 19, 2016

(54) DIAGNOSTICS FOR A PROGRAMMABLE LOGIC CONTROLLER

(75) Inventors: Robert Alan Weddle, Johnson City, TN (US); James F. Archer, Gray, TN (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 133 days.

(21) Appl. No.: 13/399,826

(22) Filed: Feb. 17, 2012

(65) Prior Publication Data

US 2013/0218493 A1 Aug. 22, 2013

(51) Int. Cl.
*G01R 21/00* (2006.01)
*G05B 19/05* (2006.01)

(52) U.S. Cl.
CPC .... *G05B 19/058* (2013.01); *G05B 2219/14075* (2013.01)

(58) Field of Classification Search
CPC .. G01R 31/024; G01R 31/025; G01R 31/026; G05B 19/058; G01L 1/125; G01L 3/103
USPC .......................................................... 702/60
See application file for complete search history.

(56) References Cited

U.S. PATENT DOCUMENTS 4,213,174 A * 7/1980 Morley et al. .................. 700/16
4,932,246 A * 6/1990 Deutsch et al. ........... 73/114.45
5,115,437 A 5/1992 Welles et al.
5,530,643 A * 6/1996 Hodorowski .................. 700/86
6,262,585 B1 7/2001 Frodsham et al.
6,949,946 B1 9/2005 Daehn
7,019,532 B2 3/2006 Glockner et al.
2006/0273820 A1 12/2006 Arnold et al.
2009/0063739 A1 3/2009 Weddle
2009/0273350 A1 11/2009 Archer et al.
2012/0036408 A1 2/2012 Rahman et al.

FOREIGN PATENT DOCUMENTS

DE 102004049906 5/2006

OTHER PUBLICATIONS

ProSafe-PLC Brochure, "Technical Product Description," Feb. 2012, pp. 1-42.
PCT Search Report for PCT/US2013/026368, dated Oct. 17, 2013. (18 pages).
PCT Search Report dated Jun. 10, 2013, for Appl. No. PCT/US2013/026368 (6 pages).

* cited by examiner

*Primary Examiner* — Tung S Lau
*Assistant Examiner* — Xiuquin Sun

(57) ABSTRACT

To reduce the cost and/or space occupied by diagnostic circuitry in a module of a programmable logic controller with multiple outputs, a multiplexer connects the same diagnostic circuitry to the different outputs. The outputs are sequentially tested with the same circuitry. To limit stress on an output driver, an overload condition may be tested while the driver is off. A different source of power is applied to the output, and the results of the application are measured for shorting to ground.

14 Claims, 5 Drawing Sheets

PLC 24
Outputs 28
Load 30
MUX 26
Power Source 32
Detect Circuit 34

DIAGNOSTICS FOR A PROGRAMMABLE LOGIC CONTROLLER

BACKGROUND

The present embodiments relate diagnostics for programmable logic controllers (PLCs).

PLCs control automated processes, such as controlling operations in a factory. A PLC connects with one or more loads, such as motors, actuators, and/or sensors. The connection allows control of the load by the PLC. However, the connection and/or the load may fail. For example, a wire becomes disconnected or shorted to ground or a high voltage.

To deal with possible connection problems, self-contained diagnostic circuitry is included in the PLC. Self-contained diagnostic circuitry is provided for each output or possible connection. However, the additional circuitry may be expensive to implement for multiple channel PLCs, both in cost and printed wiring board (PWB) real estate.

One way to limit the diagnostic circuitry is to use the output driver itself. For example, a short-to-ground or overload is to be detected. When the output driver is in an "on" state, thermal overload of the driver may occur due to the overload. The thermal overload shuts down the driver for a sufficient time to cool (e.g., a few seconds). If thermal overload occurs every time the driver is turned on, then the overload is detected. However, this may overly stress the output driver.

SUMMARY

Systems, methods and non-transitory computer readable media are provided for diagnostics in a programmable logic controller. To reduce the cost and/or space occupied by diagnostic circuitry in a module with multiple outputs, a multiplexer connects the same diagnostic circuitry to the different outputs. The outputs are sequentially tested with the same circuitry.

To limit stress on an output driver, an overload condition may be tested while the driver is off. A different source of power is applied to the output, and the results of the application are measured for shorting to ground.

The multiplexing or testing with the driver off may be used alone. Alternatively, the circuitry for testing for a short with the driver off may be used as diagnostic circuitry that is multiplexed to different outputs at different times.

In a first aspect, a system is provided for diagnostics in a programmable logic controller. A plurality of outputs is provided on the programmable logic controller. A multiplexer is configured to connect the current source and the diagnostic detection circuit to the outputs in sequence.

In a second aspect, a method is provided for diagnostics in a programmable logic controller. A diagnostic circuit is multiplexed to outputs of the programmable logic controller. A diagnostic of the outputs is measured with the same diagnostic circuit. The measuring is performed sequentially for the outputs based on the multiplexing.

In a third aspect, a system is provided for diagnostics in a programmable logic controller. A power source connects with an output of the programmable logic controller. A diagnostic circuit is configured to compare a voltage at the output to a threshold while the output is in an off state with the power source connected. The comparison tests for a short-to-ground.

In a fourth aspect, a method is provided for diagnostics in a programmable logic controller. An output driver of an output of the programmable logic controller for a load is set to an off state. A short-to-ground at an output of the programmable logic controller for a load is tested. The testing occurs without changing the output driver to an on state.

Any one or more of the aspects described above may be used alone or in combination. These and other aspects, features and advantages will become apparent from the following detailed description of preferred embodiments, which is to be read in connection with the accompanying drawings. The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the embodiments. Moreover, in the figures, like reference numerals designate corresponding parts throughout the different views.

DETAILED DESCRIPTION OF EMBODIMENTS

Diagnostic circuits are multiplexed. By cycling diagnostic circuitry through each channel, diagnostics for different channels may be measured sequentially by the same circuit. Multiplexing may reduce design complexity and may reduce product cost.

An output overload condition may be detected when the output is in an "off" state. The overload may be detected before the output is turned on. A diagnostic stimulus is used to softly drive (i.e., provide stimulus without activating the load) the load to determine if a proper load is applied. If the output is overloaded, then the output is not turned on and a diagnostic event may be triggered.

Figure 5:
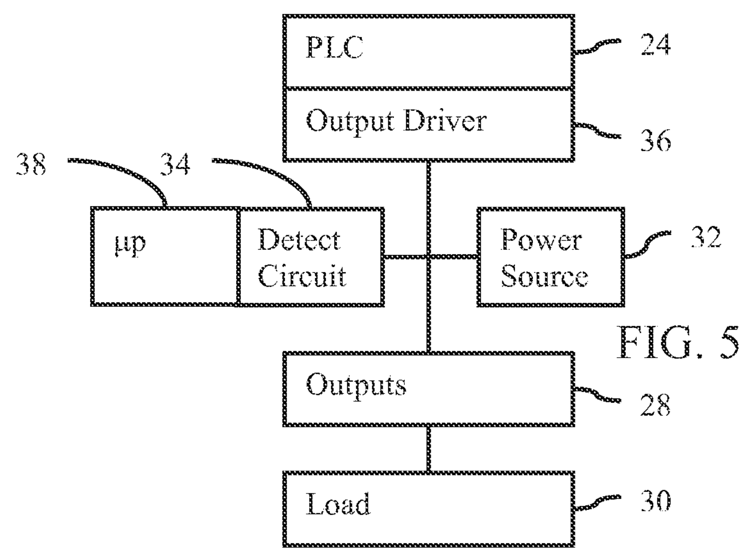
FIG. 5 is a block diagram of one embodiment of a system for "off" state diagnostics in a programmable logic controller.
Figure 7:
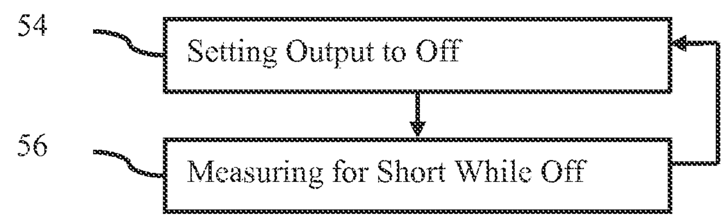
FIG. 7 is a flow chart diagram of one embodiment of a method for "off" state diagnostics in a programmable logic controller.
Figure 6:
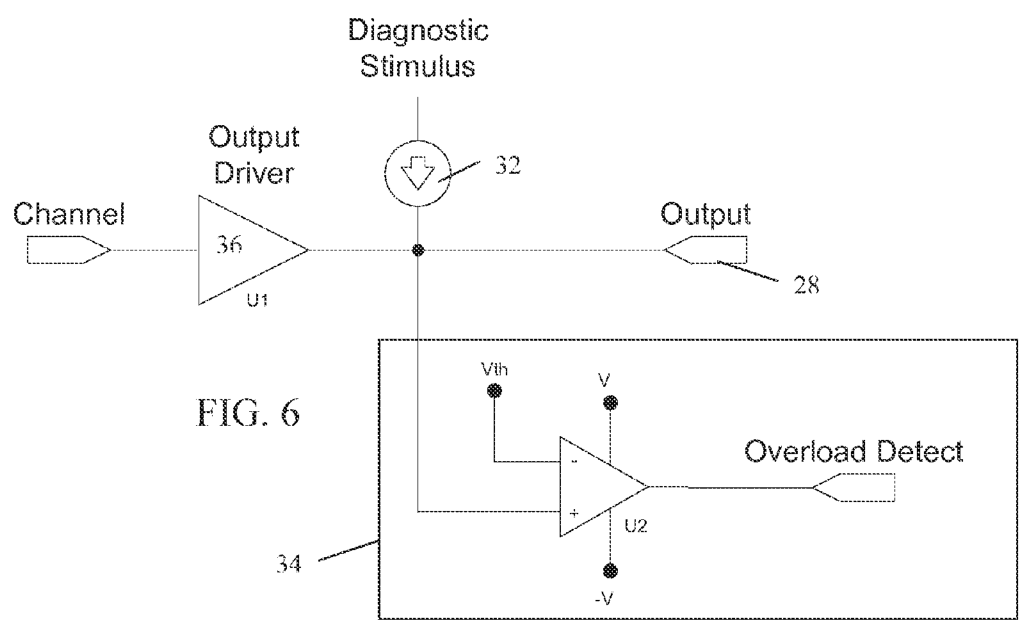
FIG. 6 is a circuit diagram of an example of the system of FIG. 5.

FIGS. 1-4 deal with the multiplexing arrangement. FIGS. 5-7 deal with the overload detection with the output in an off state. Overload detection is an example of the diagnostic circuit multiplexed to the different outputs. The multiplexing may use other diagnostic circuits instead of or in addition to the overload embodiments disclosed herein. Similarly, the overload detection disclosed herein may be used with or without the multiplexing.

Figure 1:
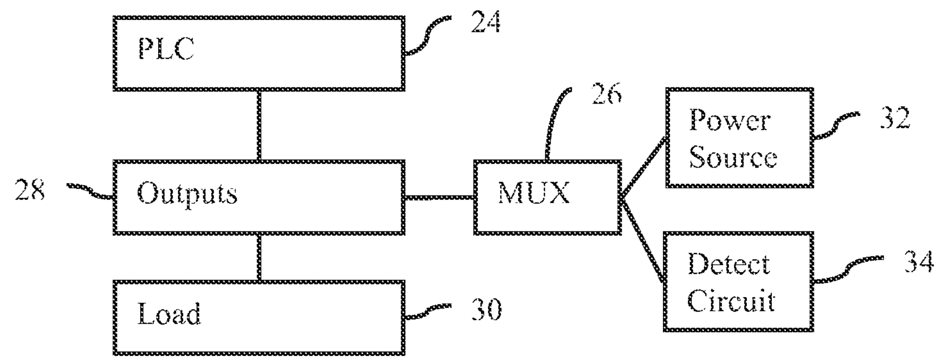
FIG. 1 is a block diagram of one embodiment of a system for multiplexing diagnostics in a programmable logic controller.
Figure 2:
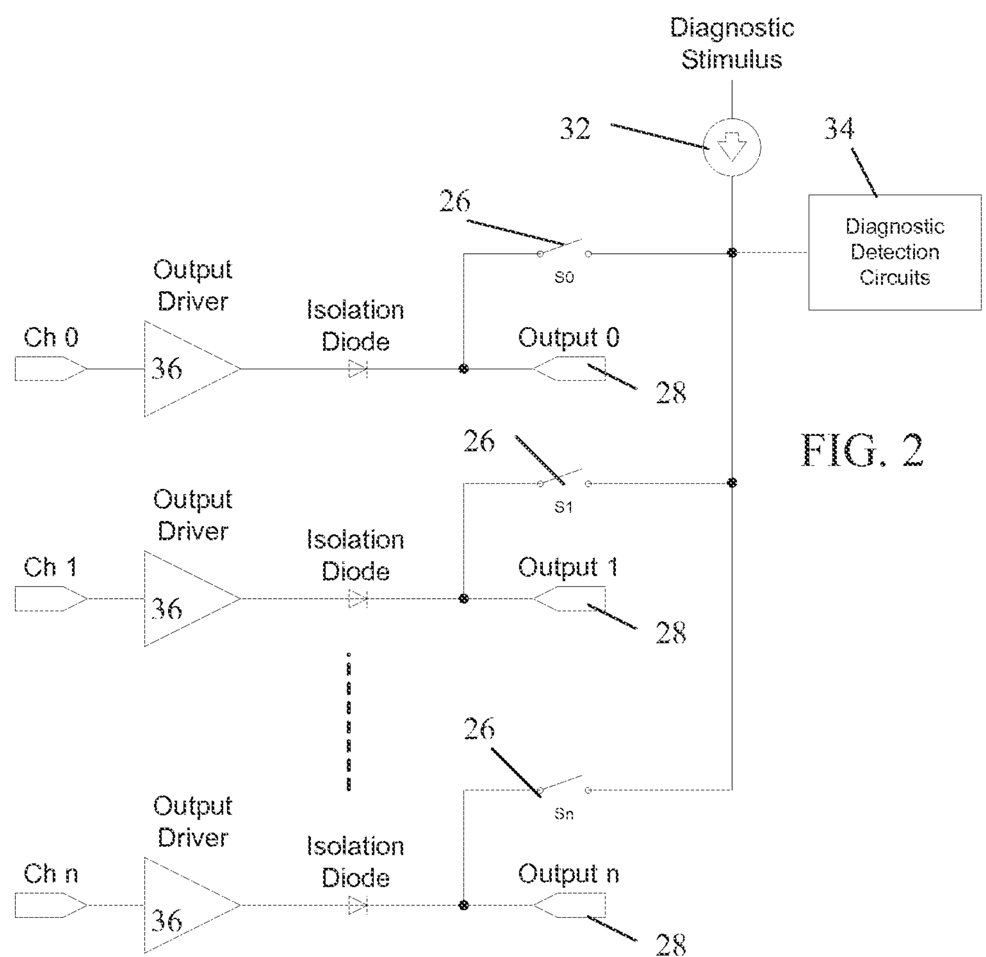
FIG. 2 is a circuit diagram of an example of the system of FIG. 1.

FIG. 1 shows a block diagram of a multiplexing system for diagnostics in a programmable logic controller. FIG. 2 shows a circuit diagram of one embodiment of the system of FIG. 1. For diagnostic operation, a diagnostic stimulus and diagnostic detection circuitry 34 are multiplexed on each output point or channel of the programmable logic controller (PLC) 24, allowing the same stimulus and diagnostic detection circuitry 34 to be used for the different outputs 28. Control software is used to cycle the multiplexer 26 through each channel to detect any possible diagnostic event and report back to the central processing unit (CPU) of the PLC 24.

The system includes the PLC 24, the multiplexer 26, outputs 28, a power source 32, and the detection circuitry 34. The load 30 is shown for reference. Additional, different, or fewer components may be provided. For example, the load 30 is not provided.

The power source 32, multiplexer 26, outputs 28, and detection circuitry 34 are part of the PLC 24, but are shown separately for discussion. Alternatively, one or more of these components is provided separate from the PLC 24, such as in a different housing or spaced by inches, feet, yards, or more from the PLC 24.

FIG. 1 shows the channels or outputs 28 and corresponding loads 30 grouped together (i.e., shows all of the outputs 28 as one box and shows all of the loads 30 as one box). FIG. 2 shows the outputs 28 separated. Similarly, separate loads 30 connect or are connectable with the outputs 28.

The PLC 24 is a central processing unit, such as a general processor, applications specific integrated circuit, field programmable gate array, digital circuit, analog circuit, combinations thereof, or now know or later developed processor. The PLC 24 includes data busses and interfaces for communicating with panels, computers, actuators, and/or sensors. The PLC 24 has a housing or is housed in a panel, cabinet or other device.

The PLC 24, based on software and/or hardware, controls operation of one or more devices or processes. The outputs 28 are for control of industrial machinery. For example, the PLC 24 operates a plurality of loads 30 used in industrial processes. Example loads 30 include pressure, temperature, force, position, light, humidity, optical, or other sensors for monitoring an industrial process or equipment. As another example, the loads 30 include pneumatic, hydraulic, electric, or other sources of force (e.g., motors, valves, or actuators) for changing the industrial process or equipment operation. Some example industrial machinery includes machinery of power facilities, chemical plants, manufacturing facilities, heat and ventilation systems, air conditioning systems, fire safety systems, reactors, or other collections of interacting parts. In other examples, the industrial machinery includes specific units, such as a cutting machine, a pressing machine, a robot, a tank, a vehicle, or any other device.

The PLC 24 has a plurality of outputs 28 for connecting with the loads 30. The outputs 28 are ports of an interface for connection. The outputs 28 are physical connectors, such as a male or female connector, and corresponding electrical interface. Other connectors may be used. Wires may extend from the outputs 28 to connect with the loads 30.

During installation, the outputs 28 are connected with the loads 30. The PLC 24 may be programmed to control the specific loads 30 at the specific outputs 28. Each output 28 is independently operated for the respective load 30. The physical and electrical separation allows independent control. In alternative embodiments, a shared connection is used, such as multiple loads 30 connected to a same output 28. Addressing or other mechanism distinguishes between control signals for the different loads 30 sharing the output 28 or the same control is used for all connected loads 30.

The outputs 28 provide electrical signals in a digital or analog format. For example, digital outputs 28 connect with the respective loads 30. The loads 30 operate based on the signals on the digital output. In one embodiment, each output is of a binary signal using either zero volts or 24 volts. Other voltages may be used. The output 28 cycles between the voltages to control a load 30. For example, a motor is either turned on or off. Other formats may be provided, such as providing digital words or control signals with other than binary information.

The outputs 28 connect with the central processing unit. Leads or traces of the central processing unit control a driver connected to the outputs 28. In alternative embodiments, an expansion buss or module is used. The central processing unit controls the output drivers of the expansion module through a buss. The expansion buss connects with the central processing unit and the outputs 28.

Any number of outputs 28 may be used. In one embodiment, the outputs 28 are grouped into groups of four. The grouping is for multiplexing. Four outputs 28, in this example, share the same power source 32 and diagnostics circuits 34. Multiple groups of four outputs 28 are used for a given PLC 24. The other groups share other diagnostic circuits 34 of the same or different design. In other embodiments, other size groups with or without multiple of the groups are used.

The PLC 24 includes output drivers 36 (see FIG. 5) connected with the outputs 28. The output drivers are circuits, pulsers, logic, digital-to-analog converters, or other devices for providing the voltage or current signals on the outputs 28. The output drivers control operation of the loads 30 based on control from the PLC 24. In one embodiment, the output drivers are each a FET. The FET is connected to switchably connect the output 28 with a high voltage or high voltage rail (e.g., 24 volts) when on and otherwise connect the output 28 to ground or disconnect the output 28 (e.g., allow the output 28 to float). The central processing unit turns the output drivers 36 on or off. Other transistors, switches, or circuits of transistors may be used.

Due to the load 30, the output 28, and/or the wire connecting the output 28 to the load 30, the connection may fail. The connection may short-to-ground (e.g., overload) or short-to-high voltage. The connection may be disconnected (i.e., open circuit). Other failures are possible, such as drawing current in an undesired manner (e.g., failure of a capacitor or inductor for phase balancing).

To detect such a failure, the power source 32, detection circuit 34, and multiplexer 26 are provided. Additional, different, or fewer components may be used for diagnosis of any failures.

The power source 32 is a voltage or current source. In one embodiment, the power source 32 is a current source providing current at a level insufficient to activate or control the load 30. For example, the current source provides current in the micro amp range (e.g., 1-9 micro amps). The load is operated with at least 1-10 milliamps. Other values may be provided, such as a load using 1-20 amps and the power source 32 providing less than one amp (e.g., milli or micro amp range). When the power source 32 provides current for diagnosis of the connection, the load 30 does not respond as if being controlled (e.g., not turned on or off). Alternatively, the diagnostic test is performed based on the power provided by the output driver 36.

The diagnostic detection circuit 34 is a voltage, current, resistance, capacitance, or inductance measuring circuit. Alternatively, the diagnosis detection circuit 34 is a frequency analyzer for extracting one or more characteristics of a response to a waveform or power from the power source 32. Any of resistors, capacitors, inductors, transistors, amplifiers, comparators, digital devices, analog devices, filters, processors, latches, or combinations thereof may be used. The diagnosis detection circuit 34 is a hardware-only circuit implementation (e.g., implementations in only analog and/or digital circuitry) or is a combination of circuits and software (and/or firmware).

The diagnostic detection circuit 34 is a single detection circuit for a given diagnostic. For example, the detection circuit 34 measures a voltage to detect a short-to-ground. In other embodiments, the single detection circuit 34 is used for different diagnoses. For example, voltage is measured. The level, change, or other characteristic of the voltage is used to identify multiple types of failure (e.g., short-to-ground, short-to-power, and open circuit). In yet other embodiments, the diagnosis detection circuit 34 includes separate circuits, with or without shared components, for detecting different types of failure. The diagnosis detection circuit 34 is a collection of circuits.

In one embodiment, the diagnosis detection circuit 34 is a voltage detector. A comparator (e.g., differential amplifier) has one input connected to the output 28 and another input connected to a reference voltage. The reference voltage is a threshold for determining whether the voltage at the output 28 indicates failure or not. Alternatively, a voltage divider or silicon logic may be used to determine the voltage or voltage difference. In one example embodiment, the comparator is operable to determine a short-to-ground when the output driver is off (e.g., zero volts). FIGS. 5 and 6 show example embodiments. In other embodiments, the diagnosis is made with the voltage driver on.

The diagnosis detection circuit 34 is configured to detect a short-to-ground, a short-to-driving voltage, and/or an open circuit between the outputs and respective loads. The result of the measurement (e.g., the voltage difference output from a differential amplifier, a binary output from a comparator or other measure) is processed to determine the diagnosis. The central processing unit uses the instantaneous measurement, the measurement over time, or other characteristic of the measurement to determine whether or not a failure has occurred. For example, a voltage at the high voltage power level while the output driver is off indicates a short-to-power. As another example, a zero or low voltage may indicate a short-to-ground. In yet another example, a failure to draw current to the load 30 may indicate an open circuit. In other embodiments, the output of the detection circuit 34 alone indicates failure or not without further processing.

The multiplexer 26 is a plurality of solid state relays. Alternatively, the multiplexer 26 is a digital multiplexer (e.g., transistor-based switches) or formed from other switching devices.

One or more switches are provided for each output 28. For example, FIG. 2 shows one switch for each output 28. Each switch connects and disconnects the output 28 from both the power source 32 and the diagnostic detection circuit 34. Since the power source 32 provides current and the diagnostic detection circuit 34 detects voltage, both are connected at a same node (e.g., switch) to the output. A plurality of switches may be used to connect and disconnect a given output to the power source 32 and detection circuit 34 in various ways depending on how the measurement is made.

The switches are controlled by the central processing unit or other processor to open and close in sequence. The same power source 32 and diagnostic detection circuit 34 are used for each of the outputs 28, at least outputs 28 of a same group. To isolate which output 28 may have a failure, the multiplexer 26 causes only one output 28 to be connected to the power source 32 and diagnostic circuit 34 at one time. The multiplexer 26 sequentially connects different outputs 28 to the power source 32 and detection circuit 34 for separate diagnosis. In alternative embodiments, failure of a combination of outputs may be detected. Sequential or individual detection may then be performed for outputs 28 of a combination (e.g., sub-set of outputs 28 tested together) that failed in order to isolate the specific output 28. Any search pattern may be used.

When an output 28 or group of outputs 28 are being measured for diagnosis, the other outputs 28 are disconnected from the power source 32 and/or the detection circuit 34. The multiplexer 26 opens the corresponding switches to disconnect. For example, a relay is de-energized, creating an air gap between conductors of the relay.

By multiplexing, the different outputs 28 may be measured for failure using the same power source 32 and/or detection circuit 34. Rather than using copies of the detection circuit 34, the same circuit sequentially is connected to different outputs for measurement. This may save room on the printed circuit board of the PLC 24 and/or reduce cost. Where grouping is used, multiple power sources 32 and/or detection circuits 34 may be used. For example, the outputs within a group of outputs 28 share the same detection circuit 34. The outputs 28 of other groups share other detection circuits 34. The power source 32 may be common across groups or separate power sources 32 are provided for the separate groups.

Figure 3:
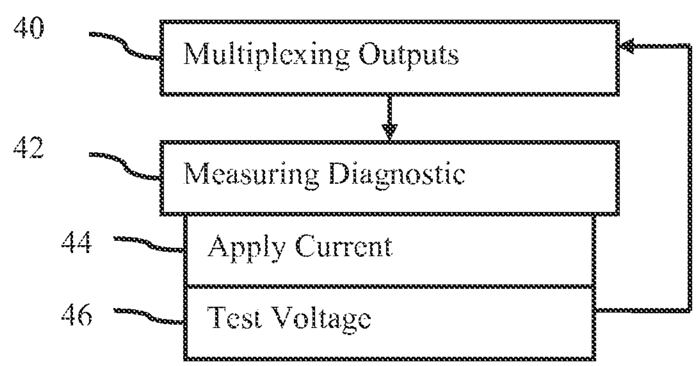
FIG. 3 is a flow chart diagram of one embodiment of a method for multiplexing diagnostics in a programmable logic controller.

FIG. 3 shows a method for diagnostics in a programmable logic controller. The method is implemented by the system of FIG. 1, the circuit of FIG. 2, and/or other systems or circuits. The method is provided in the order shown, but other orders may be provided. Additional, different or fewer acts may be provided. For example, act 44 is not provided. As another example, an act 46 is not provided, such as where a measurement other than voltage is made.

In act 40, a diagnostic circuit is multiplexed to an output of a programmable logic controller. The diagnostic circuit and a current source are connected to different outputs at different times. When a given output is connected to the diagnostic circuit, the temporal multiplexing disconnects the other outputs. The diagnostic circuit is sequenced through the outputs. In act 40, a given output or outputs are connected and other outputs are not connected.

In one example, two outputs and corresponding sequences are provided. In a first sequence (e.g., first connection arrangement) of act 40, a processor or multiplexer selects one output and not another output of the outputs of the programmable logic controller. In response to the selection, one switch is closed (e.g., shorted) to connect the selected output to the diagnostic circuit. A switch for the non-selected output is open, disconnecting the non-selected output from the diagnostic circuit. The selection results in switch commands implemented immediately or later for arranging the multiplexing. In a later sequence of act 40, a different output is selected and the previously selected output is deselected. After measuring one output, another output is selected for measurement. The switching is reversed. The switch for the previously selected output is open, and the switch for the now selected output is closed.

The example above is for two outputs. More sequences may be provided for measuring at more than two outputs. One output is selected and the other outputs are deselected.

The sequence of measurements may relate to a cycle of operation of the PLC or may be independent. For example, the measurements are made before, during or after operation of the output drivers. The output drivers may be specified to control at a specified frequency. The diagnostic measurements are interleaved to avoid causing the output drivers to operate at a rate below the specification. In one example, the multiplexing occurs at a sufficient rate to measure each output, at least in a group, in between each cycle of updating the outputs. In another example, diagnosis is performed for one output each update cycle so that a given output is tested less than every update cycle.

In act 42, a diagnostic of the output is measured. Due to the multiplexing, the same diagnostic circuit measures each of the outputs in a group or for the PLC. Based on the sequencing by the multiplexer, the measurements for the outputs are performed sequentially. The connected output is measured at any given time. As the multiplexing sequences through the outputs, the measurement with the same circuit is performed from the different outputs.

The measurement is performed for fault detection. Any type of diagnosis may be made. For example, the measurement is to detect a short-to-ground, a short-to-power, a disconnected load, or combinations thereof. In one embodiment, one or more measurements are made to detect two or more different types of fault. For example, different measurements are made to detect three different faults. Based on the type of measurement (e.g., voltage), the instantaneous value, a difference value, a change over time, or other processing of the measurement is used to indicate failure or not. For example, being above or below a threshold indicates failure.

To measure in one embodiment, a current is applied to the load in act 44. A current source applies a current insufficient to activate the load. The current is from a different source than used to drive the output for controlling or operating the load. Alternatively, the same current source used to drive the load is also used for diagnosis. In yet other alternatives, a voltage or other power source than a current source is used.

The current may be applied using the multiplexing. The multiplexing of act 40 switches in the current. When the switch closes and when the current source is on, the current is applied to the selected output through the switch. The same switch may also connect the diagnostic circuit. When a different output is to be tested, the power is applied through a different closed switch to the different output. Other switches are opened to prevent application of the current or other power to the other outputs. Alternatively, the other outputs are powered regardless of whether being tested.

In act 46, the voltage is tested for diagnostics. The load response to the application of the power is measured. Based on the multiplexing of act 40, the test is of the selected output. The same output to which power is applied is tested. The same switch may connect both the power and the diagnostic circuit. Alternatively, different switches are used.

A diagnostic test is performed by measuring the voltage. Other measurements may be used, such as current or other characteristics of the load response to the application of power. The measurements may be instantaneous or over time (e.g., averaged or a characteristic of a change). By multiplexing the connections to the output, the same measurement(s) and corresponding test(s) are performed sequentially to the different outputs.

The measurement itself may be diagnostic. For example, the measurement is binary where one state represents failure. Alternatively, the measurement is processed to diagnose any failure. For example, the measured voltage is compared to a threshold, tracked over time, or otherwise processed to determine the state of the connection between the output and the load.

The acts of FIG. 3 are repeated for different outputs. By multiplexing again in act 40, a different output is connected for application of power in act 44 and testing of the voltage in act 46 in order to measure the diagnostic in act 42. The same circuits are applied to different outputs at different times. Each repetition provides for a different selection of one or more outputs for testing and de-selection of other outputs.

Figure 4:
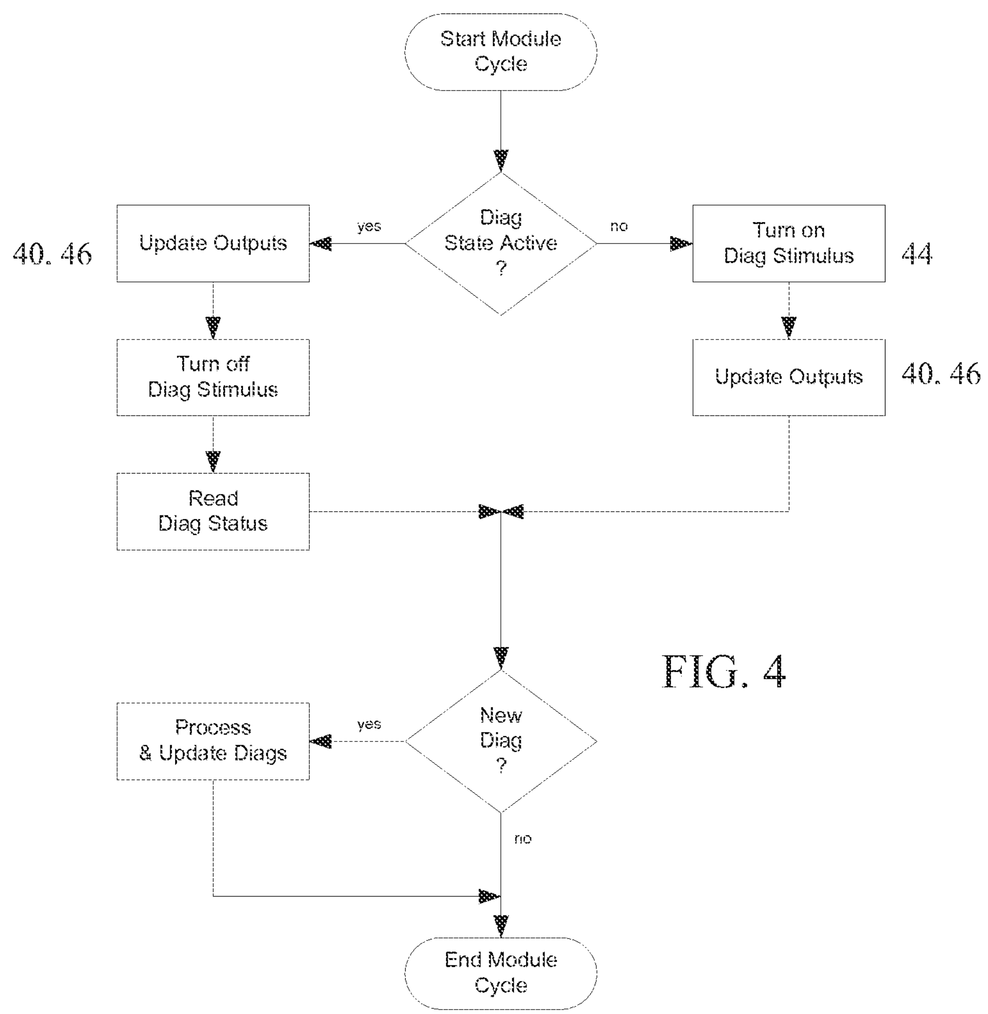
FIG. 4 is a flow chart diagram of another embodiment of a method for multiplexing diagnostics in a programmable logic controller.

FIG. 4 shows an example flow chart for diagnostic processing while also multiplexing between channels. A control algorithm is used to cycle through each channel. The example flow assumes four channels sharing diagnostic circuits. For a given pass through the flow (one module cycle), one of the four outputs is updated. In a given pass of the module cycle, the output is both operated and a diagnostic performed. After four passes, the four outputs have been operated and a diagnostic has been performed. The module cycle is at least four times faster than the specified channel switching rate of the outputs. Assuming a 50% duty cycle, two module cycles may be used to perform the diagnostic detection.

In FIG. 4, the module cycle is started. The cycle is for a first one of the four outputs. Multiplexing is used to select this first output. The cycle begins by checking whether a diagnostic state is active. If the diagnostic state is active, the output is updated. The output is updated by a process of the PLC. The load is to be controlled for the period. If the output is to stay the same, then the update verifies that there is no change. If the output is to be driven differently, then the output is changed (e.g., from a high to a low state or vice versa). The update of the output may be performed with or without the diagnostic stimulus being on. Given the relative amplitude difference, the stimulus being on may not effect driving the load. Any diagnostic measurements may be made before, during, or after updating. The diagnostic stimulus is then turned off, and the diagnostic status is read. For example, the power is no longer applied to the output and the results of the measurement are latched into memory or to the processor.

If the diagnostic state is inactive, the diagnostic stimulus is turned on, and the outputs are updated. The diagnostics are measured after the stimulus is turned on and before, during, or after the update. Alternatively, diagnostics are not measured for this update.

A check for new diagnostic information is performed next. The current measured values are compared to previous values. The latched values are compared to previous values. For example, a flag may be activated if there is a change in value above a threshold amount. If new diagnostic information is available, then the information is processed, and an update to the diagnostic data is provided. When a new diagnostic value occurs, there is a change in status of the connection. The new diagnostic value is processed to generate an alert, record an event, or send a notice.

If there is a not a difference, then the cycle is ended and another cycle may begin. For the given output, the cycle may be repeated twice. For example, the measurements are latched to memory only after turning off the stimulus. Alternatively, the reading of the diagnostic status is performed for the flow associated with there having been no active diagnostic state.

Other processes than shown in FIG. 4 may be used.

In one embodiment of measuring a diagnostic, a voltage at the output is compared to a threshold. The measurement of the voltage is made when the output driver is in an off state. This measurement tests for a short-to-ground without relying on the thermal overload of the output driver.

FIG. 5 shows one embodiment of a system for short-to-ground detection in a programmable logic controller. This system may be used as the diagnostic circuit 34 or as one of the diagnostic circuits 34 in FIGS. 1 and 2. FIG. 6 is a circuit diagram of one embodiment of the system of FIG. 5. FIGS. 5 and 6 detect an overload in the 'off' state of the output driver. If an overload condition is present, then the output is not turned on and an overload diagnostic event is triggered without applying stress from a short-to-ground on the output driver.

The system includes the PLC 24, the output driver 36, the detection circuit 34, the power source 32, a processor 38, and the outputs 28. As described above for FIG. 1, the loads 30 are to be or are connected through wires or other connections to the outputs. Additional, different, or fewer components may be provided. For example, the processor 38 is the central processing unit or other processor of the PLC 24, so is not provided separately.

The output driver 36 shown in FIG. 5 is the same or different type of output driver as discussed above for FIG. 1. For example, the output driver is a FET. Any output driver of a PLC may be used. The output driver outputs voltage or current at binary, trinary or other number of levels, such as output zero volts for an off state and 24 volts for an on state.

The PLC 24, outputs 28, loads 30, and power source 32 are the same as discussed above for FIG. 1. Other PLC, outputs, loads, or power sources may be used.

The diagnostic circuit 34 is the same or different than discussed above for FIGS. 1 and 2. The diagnostic circuit 34 of FIGS. 5 and 6 may be one part of the diagnostic circuit 34 of FIGS. 1 and 2.

In one embodiment, the diagnostic circuit 34 is a comparator, such as an operational amplifier or network of transistors. One input of the comparator is connected to the output 28. The other input is connected to a reference voltage, such as a threshold. The power source 32 also connects with the output, such as at a same node as the diagnostic circuit 34. The power source applies power, such as current, to the load. The power is insufficient to change or drive the load, but sufficient to result in a detectable voltage at the output.

The comparator compares the voltage at the output to the reference voltage. An overload condition for the output driver 36 (U1) is detected by measuring the voltage drop across the load 30 while a diagnostic stimulus is applied, such as applying a small constant current. If the connection to the load 30 is shorted to ground, the voltage at the output is low or zero. The comparison shows a large difference, resulting in a positive output (e.g., logic high) of the comparator. If the comparator U2 detects that the voltage drop is below the threshold, $V_{th}$, then an overload condition is present. Conversely, if the connection is good, the resistance at the load causes a non-zero voltage at the output. The voltage is above the threshold, resulting in a negative output (e.g., logic low) of the comparator. The logic may be reversed where logic low indicates the positive (i.e., is a fault). The threshold voltage may be selected based on the load or is predetermined for any load.

In the example of FIG. 6, the comparator has positive and negative voltage power. One of the power inputs may be connected to ground instead. As an alternative to the comparator, a voltage divider, differential amplifier, digital circuit, analogy circuit, or combinations thereof may be used to detect the short-to-ground.

The processor 38 acts upon the results of the measurement. The processor is configured to react to the short-to-ground detection of the comparator or other circuit. Based on the comparison or determination of a short-to-ground, the processor 38 prevents driving of the output drivers 36 until a repetition of the diagnostic measurement indicates no overload. An event or warning may be sent so that someone may examine the connection and replace any wire or the load 30. The processor 38 provides a diagnostic event for the PLC 24 or causes the PLC 24 to send a notification to a panel or supervisory computer.

The processor 38 is the central processing unit of the PLC 24 or a separate processor. The processor 38 may be implemented in various forms of hardware, software, firmware, special purpose processors, or a combination thereof. Some embodiments are implemented in software as a program tangibly embodied on a non-transitory program storage device. By implementing with a system or program, diagnostic testing, multiplexing, and/or updates of output drivers may be provided as part of diagnostic checking of connections to the PLC.

The processor 38 is part of a panel, PLC, computer, personal computer, server, workstation, network processor, or other now known or later developed processing system. Various peripheral devices such as, for example, a display, a disk storage device (e.g., a magnetic or optical disk storage device), a keyboard, a printing device, and a mouse, may be operatively coupled to the processor 38. A program may be uploaded to, and executed by, the processor 38 comprising any suitable architecture. Likewise, processing strategies may include multiprocessing, multitasking, parallel processing and the like. The processor 38 is implemented on a computer platform having hardware, such as one or more central processing units (CPU), a random access memory (RAM), and input/output (I/O) interface(s). The computer platform also includes an operating system and microinstruction code. The various processes and functions described herein may be either part of the microinstruction code or part of the program (or combination thereof) which is executed via the operating system. Alternatively, the processor 38 is one or more processors in a network.

The instructions, user input, rules, and/or other information are stored in a non-transitory computer readable memory. The memory is an external storage device, RAM, ROM, and/or a local memory (e.g., solid state drive or hard drive). The same or different computer readable media may be used for the instructions and other data. The memory may be implemented using a database management system (DBMS) managed by the processor 38 and residing on a memory, such as a hard disk, RAM, or removable media. Alternatively, the memory is internal to the processor 38 (e.g. cache). The memory stores events, control processes, and/or operation processes.

The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Because some of the constituent system components and method steps depicted in the accompanying figures are preferably implemented in software, the actual connections between the system components (or the process steps) may differ depending upon the manner in which the present embodiments are programmed.

The detection circuit 34 for detecting overloading while the output driver 36 is in the off state may be used with the multiplexing of FIGS. 1-4. For example, switches connect the detection circuit 34 and the power source 32 to different outputs and corresponding loads at different times. A measurement of the loading state is made for each output while connected. In alternative embodiments, a separate detection circuit 34 is provided for each output.

FIG. 7 shows a method for overload detection diagnostics in a programmable logic controller. The method is implemented with the system of FIG. 5, the circuit of FIG. 6, and/or other systems or circuits. The method is performed in the order shown. Additional, different, or fewer acts may be provided. For example, a multiplexing act is added for each repetition.

In act 54, an output driver of an output of the programmable logic controller is set to zero or off. In the off state, power is not provided to the load. Power sufficient to drive the load, such as power to turn on the load, is not provided. Zero power or power insufficient to drive the load may be provided in the off state.

The state is set to off by maintaining the output driver in the off state. For example, a FET does not connect the load to a voltage source and is instead in an "open" or non-active state. In one embodiment, the measurement is to be performed before the output driver is turned after powering the PLC. Alternatively, the state is set by switching the output driver from an active state (e.g., "on" state) to an off state. For example, the FET connecting a voltage rail to the output is turned off.

With the output driver in the off state, the measurement of act 56 may be performed. The output driver is maintained in the off state during the testing.

In act 56, the output is tested for a short-to-ground. The output is connected to a load at the time of the measurement or measurements. The programmable logic controller causes the diagnostic test to occur. In response to a trigger, for every cycle of the output, periodically, or based on other criteria, the programmable logic controller performs the diagnostic on the output.

The testing occurs without changing the output driver to an on state. While the output driver is in the off state, current is applied at the output. The current is insufficient to activate the load, but sufficient to cause a voltage or voltage drop across resistance of the load. By measuring the voltage at the output caused by applying the current, the overload may be detected. Any short-to-ground overloads the output, limiting or not allowing a potential above ground. When the voltage at the output is below a threshold voltage or different enough from a reference voltage, the short-to-ground is detected.

If not detected, the output driver of the PLC may be activated. When the output driver is turned on, there is not likely a short to ground. As a result, the output driver may not be stressed or harmed.

If an overload is detected, then the output driver is maintained in the off state until the overload is remediated. The output may be tested periodically or is tested after input from a user or panel that the connection or load is fixed. The output driver is not turned on until the diagnosis indicates no overload. Alternatively, the thermal overload of the driver is used as another or back up indication of an overload condition.

An event or warning may be sent to a panel, computer, or server in response to a detected overload. Any event processing may be provided.

The acts of FIG. 7 may be repeated. The repetition is for the same output or a different output. For example, the repetition of the setting and testing is for other outputs. Using multiplexing, the same diagnostic detection circuit may be used for testing for overload on different outputs at different times. The same power source and detection circuit are connected to the outputs sequentially.

Various improvements described herein may be used together or separately. Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A system for diagnostics for a programmable logic controller, the system comprising:

a plurality of outputs of the programmable logic controller connectable with respective loads;

an output driver connected with the plurality of outputs;

a current source;

a diagnostic detection circuit;

a multiplexer configured to connect the current source and the diagnostic detection circuit to the plurality of outputs in sequence; and a central processing unit, wherein the plurality of outputs comprise outputs of an expansion bus connected with the central processing unit of the programmable logic controller, wherein the output driver provides driver current for operating the respective loads, the central processing unit operating the output driver, wherein the current source is configured to provide a diagnostic current operable to avoid operating the respective loads, wherein the multiplexer comprises a plurality of switches, each of the switches connecting one of the plurality of outputs to the current source and the diagnostic detection circuit, the multiplexer operable to select a single output of the plurality of outputs at a given time by closing the respective switch, the current source and the diagnostic detection circuit are connected at a same node to the single output, wherein multiplexing for a first sequence comprises:

selecting a first output and not a second output of the plurality of outputs of the programmable logic controller; and connecting, with a first switch of the plurality of switches, the first output to the diagnostic detection circuit, the connecting being in response to the selecting of the first output, the connecting being while a second switch is open, the second switch disconnecting the second output from the diagnostic detection circuit;

wherein measuring for the first sequence comprises:

applying power to the first output through the first switch with the first switch connecting the first output to the diagnostic detection circuit; and measuring, responsive to the applying of the power to the first output, a first diagnostic for the first output with the diagnostic detection circuit;

wherein multiplexing for a second sequence comprises:

selecting the second output after measuring for the first output; and connecting, with the second switch, the second output to the diagnostic circuit, the connecting being in response to the selecting of the second output, the connecting being while the first switch is open, the open second switch disconnecting the second output from the diagnostic detection circuit; and wherein measuring for the second sequence comprises:

applying power to the second output through the second switch with the second switch connecting the second output to the diagnostic circuit; and measuring, responsive to the applying of the power to the second output, a second diagnostic for the second output with the diagnostic detection circuit.

2. The system of claim 1 wherein the plurality of outputs comprise digital outputs operable to be connected with the respective loads.

3. The system of claim 1 wherein the diagnostic detection circuit comprises a voltage detector.

4. The system of claim 1 wherein the diagnostic detection circuit is configured to detect a short to ground, a short to a driving voltage, and an open circuit between the outputs and respective loads.

5. The system of claim 1 wherein the multiplexer comprises a plurality of solid state relays.

6. The system of claim 1 wherein the diagnostic detection circuit comprises a comparator configured to compare a voltage at the first output of the plurality of outputs to a threshold while the first output is in an off state, the comparison testing for a short to ground.

7. A method for diagnostics for a programmable logic controller, the method comprising:

multiplexing a diagnostic circuit to outputs of the programmable logic controller;

measuring a diagnostic of the outputs with the same diagnostic circuit, the measuring being performed sequentially for the outputs based on the multiplexing, wherein multiplexing comprises connecting the diagnostic circuit and a current source to different ones of the outputs at different times, wherein multiplexing for a first sequence comprises:

selecting a first output and not a second output of the outputs of the programmable logic controller; and connecting, with a first switch, the first output to the diagnostic circuit, the connecting being in response to the selecting of the first output, the connecting being while a second switch is open, the open second switch disconnecting the second output from the diagnostic circuit;

wherein measuring for the first sequence comprises:

applying power to the first output through the first switch with the first switch connecting the first output to the diagnostic circuit; and measuring, responsive to the applying of the power to the first output, a first diagnostic for the first output with the diagnostic circuit;

wherein multiplexing for a second sequence comprises:

selecting the second output after measuring for the first output; and connecting, with the second switch, the second output to the diagnostic circuit, the connecting being in response to the selecting of the second output, the connecting being while the first switch is open, the open second switch disconnecting the second output from the diagnostic circuit; and wherein measuring for the second sequence comprises:

applying power to the second output through the second switch with the second switch connecting the second output to the diagnostic circuit; and measuring, responsive to the applying of the power to the second output, a second diagnostic for the second output with the diagnostic circuit.

8. The method of claim 7 wherein measuring comprises applying a current source and measuring a voltage.

9. The method of claim 7 wherein measuring comprises measuring for a short to ground, a short to power, a disconnected load, or combinations thereof.

10. The method of claim 7 further comprising, for a cycle of a first output of the outputs:

selecting the first output with the multiplexing;

checking whether a diagnostic state is active;

turning on the diagnostic state when the diagnostic state is not active;

updating at least one of the outputs when the diagnostic state is active or after turning on the diagnostic state;

performing the measuring;

checking whether a new diagnostic value occurred from the measuring; and processing the new diagnostic value when occurring and ending the cycle or ending the cycle without processing when the new diagnostic measurement does not occur.

11. The method of claim 7 wherein measuring comprises comparing a voltage at a first one of the outputs to a threshold while the first output is in an off state, and testing for a short to ground based on the comparison.

12. A system for diagnostics for a programmable logic controller, the system comprising:

a plurality of outputs of the programmable logic controller;

a power source connected with the plurality of outputs;

a diagnostic detection circuit configured to compare a voltage at one of the plurality of outputs to a threshold while the one output is in an off state with the power source connected, the comparison testing for a short-to-ground;

a multiplexer configured to connect and disconnect the power source and the diagnostic detection circuit to the one output and configured to connect and disconnect the power source and the diagnostic detection circuit to other outputs of the plurality of outputs of the programmable logic controller in sequence;

an output driver of the programmable logic controller, the output driver configured to be output zero volts in the off state, and a processor configured to detect the short-to-ground when the voltage is below a reference voltage, and react to a detection of the short-to-ground by causing the programmable logic controller to send a notification to a panel or supervisory computer, wherein the multiplexer comprises a plurality of switches, each of the switches connecting one of the outputs to the power source and the diagnostic detection circuit, the multiplexer operable to select a single output of the outputs at a given time by closing the respective switch, the power source and the diagnostic detection circuit connected at a same node to the single output, wherein multiplexing for a first sequence comprises:

selecting a first output and not a second output of the plurality of outputs of the programmable logic controller; and connecting, with a first switch of the plurality of switches, the first output to the diagnostic detection circuit, the connecting being in response to the selecting of the first output, the connecting being while a second switch is open, the second switch disconnecting the second output from the diagnostic detection circuit;

wherein measuring for the first sequence comprises:

applying power to the first output through the first switch with the first switch connecting the first output to the diagnostic detection circuit; and measuring, responsive to the applying of the power to the first output, a first diagnostic for the first output with the diagnostic detection circuit;

wherein multiplexing for a second sequence comprises:

selecting the second output after measuring for the first output; and connecting, with the second switch, the second output to the diagnostic circuit, the connecting being in response to the selecting of the second output, the connecting being while the first switch is open, the open second switch disconnecting the second output from the diagnostic detection circuit; and wherein measuring for the second sequence comprises:

applying power to the second output through the second switch with the second switch connecting the second output to the diagnostic circuit; and measuring, responsive to the applying of the power to the second output, a second diagnostic for the second output with the diagnostic detection circuit.

13. The system of claim 12 wherein the power source comprises a current source connected with the output and the diagnostic circuit.

14. The system of claim 12 wherein the diagnostic circuit comprises a comparator with a first input connected with the output and the power source and a second input connected with a reference voltage.

* * * * *